(12) United States Patent
Yaku et al.

(10) Patent No.: US 9,383,231 B2
(45) Date of Patent: Jul. 5, 2016

(54) PHOTOELECTRIC ENCODER HAVING AN INTERFERENCE PATTERN SIGNAL PROCESSING UNIT DETECTS THE PSEUDO-RANDOM DATA OF THE ABSOLUTE PATTERN OF AN ABSOLUTE SCALE

(71) Applicant: Mitutoyo Corporation, Kawasaki, Kanagawa (JP)

(72) Inventors: Toru Yaku, Kanagawa (JP); Yoshiaki Kato, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 176 days.

(21) Appl. No.: 14/474,594

(22) Filed: Sep. 2, 2014

(65) Prior Publication Data
US 2015/0060653 A1   Mar. 5, 2015

(30) Foreign Application Priority Data

Sep. 3, 2013 (JP) .................................. 2013-181784

(51) Int. Cl.
*G01D 5/347* (2006.01)

(52) U.S. Cl.
CPC ........ *G01D 5/34784* (2013.01); *G01D 5/34715* (2013.01); *G01D 5/34723* (2013.01); *G01D 5/34746* (2013.01)

(58) Field of Classification Search
CPC ............ G01D 5/2497; G01D 5/34746; G01D 5/2455; G01D 5/2495; G01D 5/34776
USPC .......... 250/231.13, 231.16, 231.18, 221, 239; 341/11–13; 356/616, 617, 622, 356/399–401
See application file for complete search history.

(56) References Cited

U.S. PATENT DOCUMENTS 4,009,377 A * 2/1977 Elms .................... G05B 19/291
                                                         318/603
4,799,798 A   1/1989 Erb
(Continued)

FOREIGN PATENT DOCUMENTS

DE    3703327 A1   8/1987
EP    2006642      12/2008
(Continued)

OTHER PUBLICATIONS

European Office Action dated Nov. 16, 2015, 4 pages.
(Continued)

*Primary Examiner* — Que T Le
(74) *Attorney, Agent, or Firm* — Rankin, Hill & Clark LLP

(57) ABSTRACT

A photoelectric encoder includes an absolute scale provided with an absolute pattern based on pseudo-random data, and a detection head including a light source that emits light to the absolute pattern of the absolute scale, and a light receiving unit that receives light from the absolute pattern, and it detects an absolute position of the detection head with respect to the absolute scale. In the photoelectric encoder, the absolute pattern is composed of a grating part and a dark part arranged in a repetitive manner. The photoelectric encoder further includes an interference pattern generation means that generates an interference pattern in combination with the grating part, and an interference pattern signal processing unit that detects the pseudo-random data of the absolute pattern based on the interference pattern received by the light receiving unit.

9 Claims, 18 Drawing Sheets

(56) References Cited

U.S. PATENT DOCUMENTS

| 5,279,044 | A | 1/1994 | Bremer |
| 2004/0246500 | A1 | 12/2004 | Holzapfel et al. |

FOREIGN PATENT DOCUMENTS

| JP | 5-71984 | 3/1993 |
| JP | 7-286861 | 10/1995 |
| JP | 2004-317503 | 11/2004 |
| WO | 2011/034910 A2 | 3/2011 |

OTHER PUBLICATIONS

Stevenson, J T M et al.; "Absolute position measurement using optical detection of coded patterns"; J. Phys. E:Sci. Instrum.; (1988); pp. 1140-1145; vol. 21; UK.

* cited by examiner

PHOTOELECTRIC ENCODER HAVING AN INTERFERENCE PATTERN SIGNAL PROCESSING UNIT DETECTS THE PSEUDO-RANDOM DATA OF THE ABSOLUTE PATTERN OF AN ABSOLUTE SCALE

INCORPORATION BY REFERENCE

This application is based upon and claims the benefit of priority from Japanese patent application No. 2013-181784, filed on Sep. 3, 2013, the disclosure of which is incorporated herein in its entirety by reference.

BACKGROUND OF THE INVENTION

1. Field of the Invention

The present invention relates a photoelectric encoder.

2. Description of Related Art

A photoelectric absolute encoder that obtains an absolute position by detecting a pseudo-random pattern placed on a scale is known. As the pseudo-random pattern on the scale, a pattern called M-sequence code can be used for example ("Absolute position measurement using optical detection of coded patterns", J T M Stevenson et. al, J. Phys, E:Sci. Instrum. 21(1988) 1140-1145). The absolute encoder disclosed in Japanese Unexamined Patent Application Publication No. H07-286861 guides an image of a pseudo-random pattern on a scale to a detector using a lens and thereby detects the position of the detector with respect to the scale. Further, the absolute encoder disclosed in Japanese Unexamined Patent Application Publication No. 2004-317503 uses a lens array instead of a lens.

Further, an absolute encoder having a structure with no lens is also known. The absolute encoder disclosed in Japanese Unexamined Patent Application Publication No. H05-71984 directly detects a light ray having passed through a pseudo-random pattern on a scale using a detection element.

SUMMARY OF THE INVENTION

The absolute encoder disclosed in Japanese Unexamined Patent Application Publication No. H07-286861 uses a lens. There is thus a problem that the device size is large and the costs are high. Further, the absolute encoder disclosed in Japanese Unexamined Patent Application Publication No. 2004-317503 uses a lens array in place of a lens. Although this reduces the device size, there is still the problem of high costs.

On the other hand, the absolute encoder disclosed in Japanese Unexamined Patent Application Publication No. H05-71984 does not use a lens. However, when the distance between the scale and the photo detector is large, a light ray having passed through the pseudo-random pattern diverges, and the photo detector cannot detect the pseudo-random pattern as the pseudo-random pattern. In order to prevent the divergence of a light ray having passed through the pseudo-random pattern, a coherent light source such as a laser that can emit parallel light with a fairly high parallelism may be used as a light source. However, even if the parallel light is emitted, when the distance between the scale and the photo detector is large, light diffraction occurs due to the interaction between the pseudo-random pattern and the parallel light. Then, because of the interference of diffracted light, a pattern different from the pseudo-random pattern on the scale reaches the photo detector.

Therefore, a gap between the scale and the detection head cannot be enlarged. It is thus necessary to significantly narrow down the gap between the scale and the detection head. However, if the gap between the scale and the detection head is too narrow, there is a problem that measurement of the encoder cannot be carried out when the gap varies due to scale flexure or when a foreign matter such as metal powder enters.

The present invention has been accomplished to solve the above problems and an object of the present invention is thus to provide a photoelectric encoder that can have a large gap between a scale and a detection head without using a lens and can detect pseudo-random data on the scale.

A photoelectric encoder according to one aspect of the invention includes an absolute scale provided with an absolute pattern based on pseudo-random data, a detection head including a light source that emits light to the absolute pattern of the absolute scale, and a light receiving unit that receives light from the absolute pattern, in which the photoelectric encoder detects an absolute position of the detection head with respect to the absolute scale, and the absolute pattern is composed of a grating part and a dark part arranged in a repetitive manner, an interference pattern generation means that generates an interference pattern in combination with the grating part, and an interference pattern signal processing unit that detects the pseudo-random data of the absolute pattern based on the interference pattern received by the light receiving unit.

In the above-described photoelectric encoder, the interference pattern generation means may include the light source that emits incoherent light in the detection head, and an auxiliary grating that is placed on a light path where a light ray emitted from the light source passes through the absolute pattern and enters the light receiving unit.

In the photoelectric encoder according another aspect of the invention, the light source may emit coherent light.

In the photoelectric encoder according one aspect of the invention, a half-power angle Et where an emission intensity of the light source is 50% of an emission intensity on a center axis of the light source, a data pitch $P_{DATA}$ of the absolute pattern, an distance u between the absolute scale and the auxiliary grating, and an distance v between the auxiliary grating and the light receiving unit may satisfy a conditional expression (1):

$$\theta_L \leq \tan^{-1}\left(\frac{P_{DATA}}{2(u+v)}\right) \tag{1}$$

Further, in the photoelectric encoder according one aspect of the invention, an incremental scale provided with an incremental pattern may be placed in parallel with the absolute scale.

Furthermore, in the above-described photoelectric encoder, a grating pitch of the grating part of the absolute pattern and a grating pitch of the incremental pattern may be equal.

Further, in the photoelectric encoder according one aspect of the invention, pseudo-random data of the absolute pattern may be detected based on a periodical signal obtained from an interference pattern generated by the incremental pattern.

Further, in the photoelectric encoder according one aspect of the invention, a grating pitch of the absolute pattern and a grating pitch of the incremental pattern may be different.

An absolute position detection method according to one aspect of the invention is an absolute position detection method using a photoelectric encoder including an absolute scale provided with an absolute pattern based on pseudo-random data, a detection head including a light source, an interference pattern generation means and a light receiving unit, and an interference pattern signal processing unit, for detecting an absolute position of the detection head with respect to the absolute scale, the method including a step of emitting light to the absolute pattern by the light source, a step of generating an interference pattern in the light from the absolute pattern by the interference pattern generation means, a step of receiving the interference pattern by the light receiving unit, and a step of detecting the pseudo-random data of the absolute pattern based on the interference pattern by the interference pattern signal processing unit.

According to the above-described aspects of the present invention, it is possible to provide a photoelectric encoder that can have a large gap between a scale and a detection head without using a lens and can detect pseudo-random data on the scale.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Embodiment

Exemplary embodiments of the present invention are described hereinafter with reference to the drawings.

Figure 1:
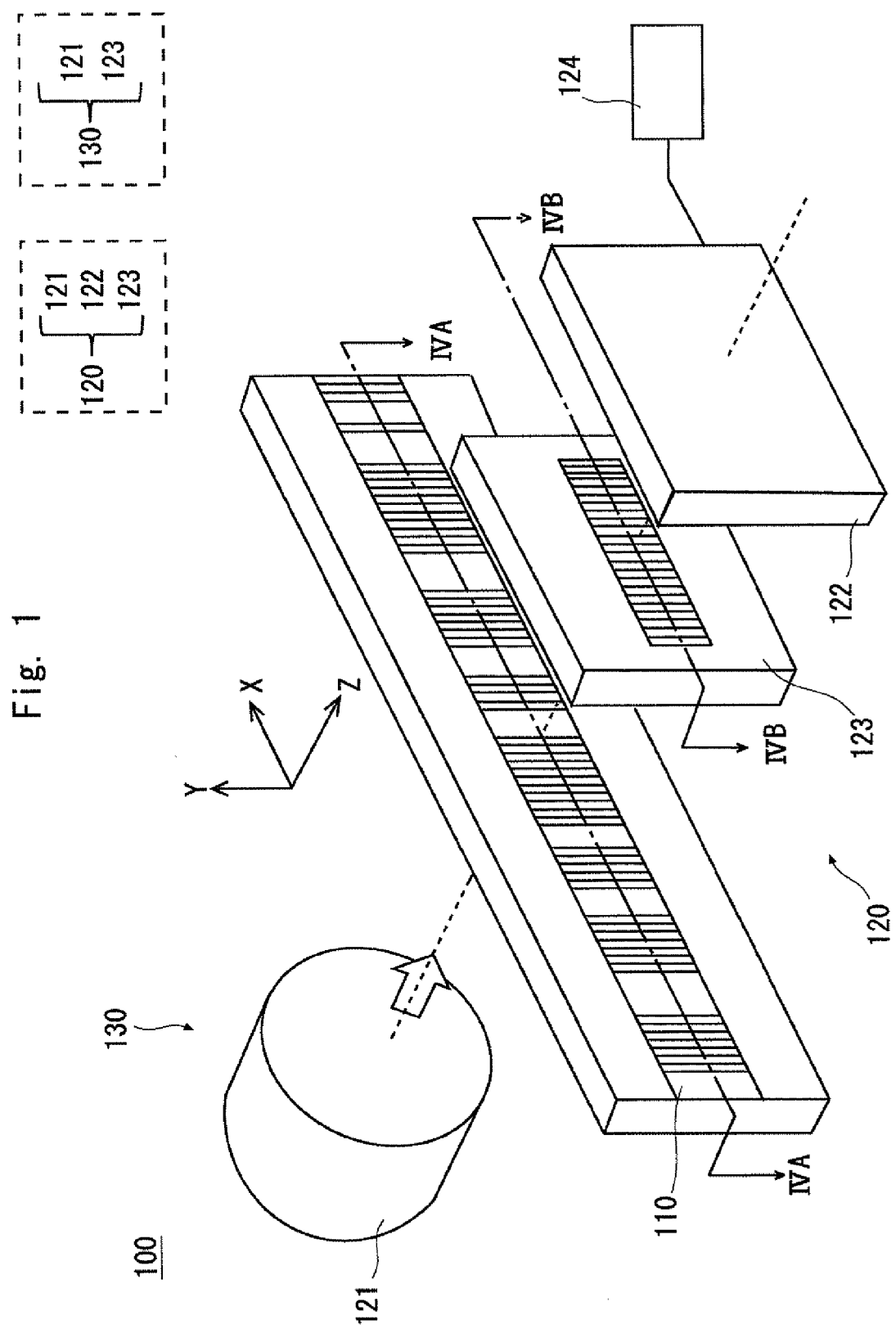
FIG. 1 is a view showing a structure of a photoelectric encoder according to a first embodiment.

FIG. 1 is a view showing a structure of a photoelectric encoder 100 according to a first embodiment. The photoelectric encoder 100 includes an absolute scale 110 and a detection head 120. The detection head 120 can move along the absolute scale 110 in the measurement axis direction, and the absolute position of the detection head 120 with respect to the absolute scale 110 is detected. The detection head 120 includes an incoherent light source 121, a light receiving unit 122, and an interference pattern signal processing unit 124. Further, in the detection head 120 of the photoelectric encoder 100 according to the first embodiment, an absolute auxiliary grating 123 is placed between the absolute scale 110 and the light receiving unit 122.

The incoherent light source 121 shown in FIG. 1 emits incoherent light. As the incoherent light source 121, LED (Light Emitting Diode), halogen lamp or the like is used, for example.

The incoherent light source 121 emits light to the absolute scale 110. The light receiving unit 122 receives an interference pattern that is generated as the light passes through the absolute scale 110 and the absolute auxiliary grating 123 and converts it into an electrical signal.

Figure 2:
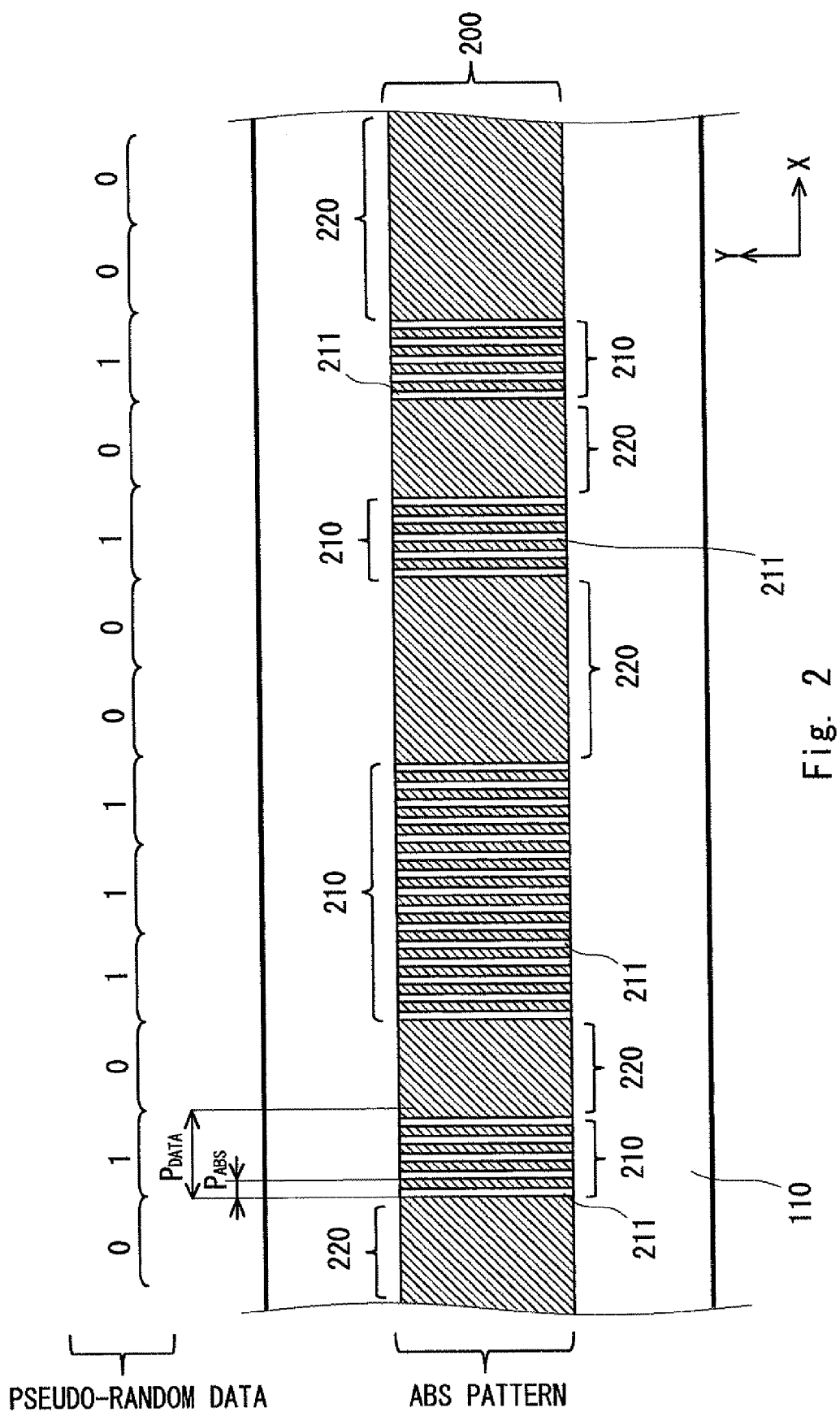
FIG. 2 is a view showing a structure of an absolute scale according to the first embodiment.

FIG. 2 is a view showing a structure of the absolute scale 110 according to the first embodiment. As shown in FIG. 2, the absolute (ABS) scale 110 is provided with an absolute (ABS) pattern 200. The ABS pattern 200 is composed of a grating part 210 and a dark part 220 that are arranged in a repetitive manner based on pseudo-random data. The grating part 210 is a region corresponding to the pseudo-random data "1", and the dark part 220 is a region corresponding to the pseudo-random data "0".

As shown in FIG. 2, the grating part 210 of the ABS scale 110 is provided with an absolute (ABS) grating 211. The grating part 210 of the ABS scale 110 corresponds to a light transmitting part with a data pitch $P_{DATA}$, and further the ABS grating 211 with a data pitch $P_{ABS}$ is provided within the range of the data pitch $P_{DATA}$. The dark part 220 is provided with a light non-transmitting part. FIG. 2 shows this opaque part by hatching. The grating part 210 may be arranged continuously. In this case, the length of the grating part 210 is an integral multiple of the data pitch $P_{DATA}$.

Figure 3:
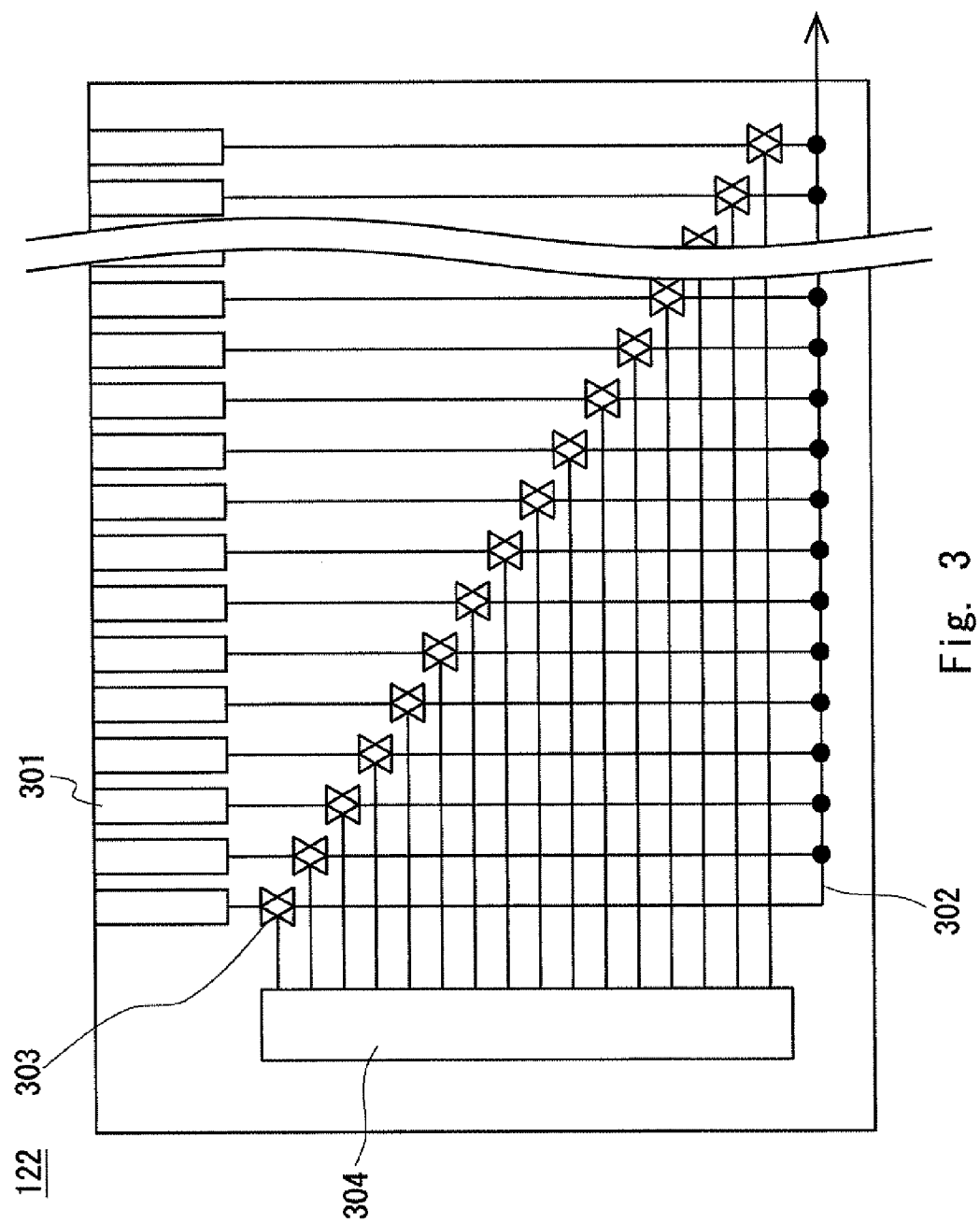
FIG. 3 is a view showing a structure of a light receiving unit according to the first embodiment.

FIG. 3 is a view showing a structure of the light receiving unit 122 according to the first embodiment. As shown in FIG. 3, a sensor 301 that detects light, an analog switch 303 and a switch control logic circuit 304 are mounted on the light receiving unit 122, and a photoelectric conversion element such as a CCD linear image sensor or a CMOS linear image sensor is used, for example. The electrical signal converted in the sensor 301 passes through the analog switch 303 and a wire 302 where ON/OFF is controlled by the switch control logic circuit 304 so that the interference pattern received by the light receiving unit 122 can be observed as an electrical signal and then enters the interference pattern signal processing unit 124.

The interference pattern signal processing unit 124 detects pseudo-random data of the ABS pattern 200 based on the interference pattern received by the light receiving unit 122. The interference pattern signal processing unit 124 may be placed inside the detection head 120 or placed externally by running the wire 302 to the outside of the detection head 120.

Figure 4:
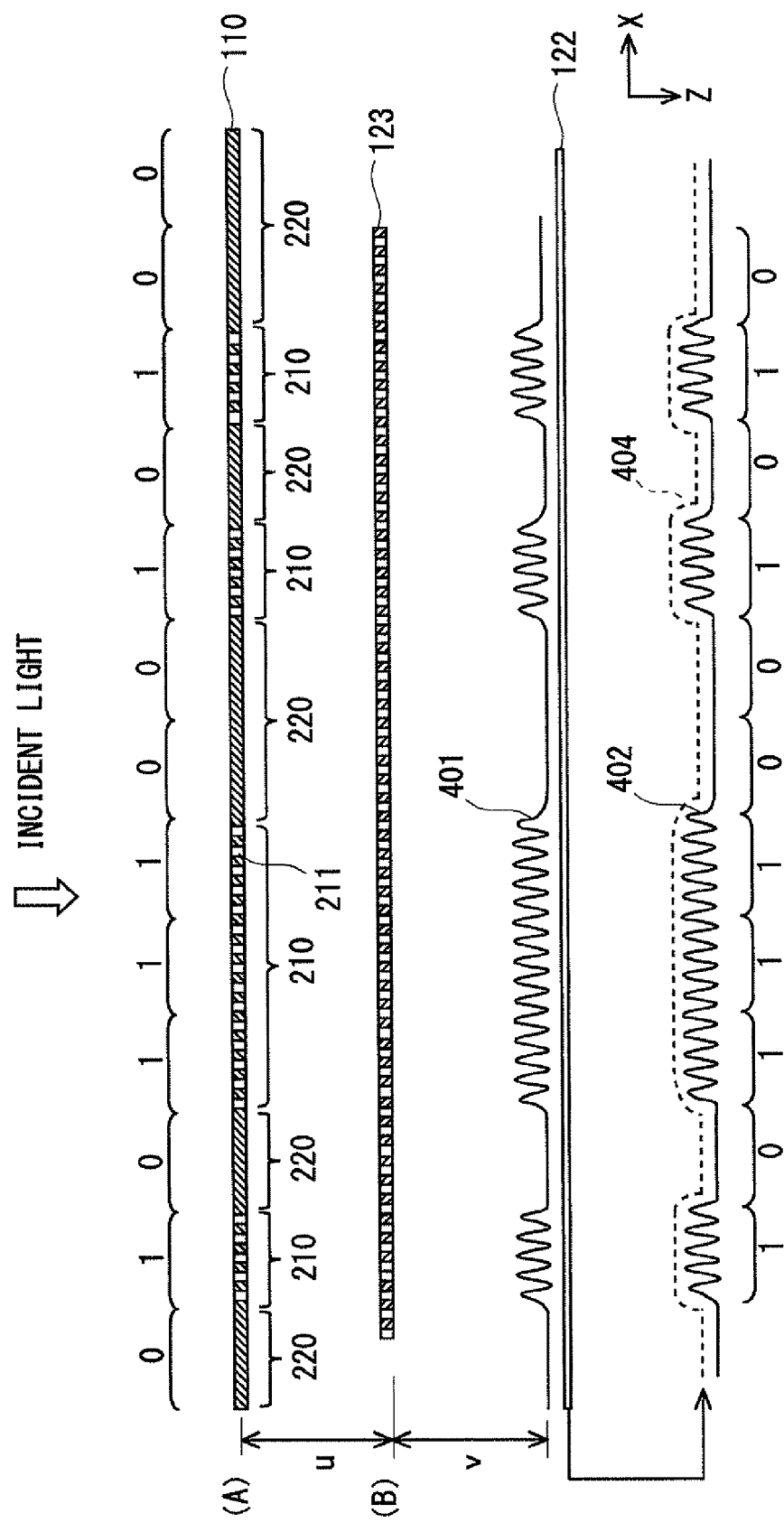
FIG. 4 is a cross-sectional view of the photoelectric encoder according to the first embodiment.

FIG. 4 is a cross-sectional view of the photoelectric encoder according to the first embodiment. As shown in FIG. 4, the absolute (ABS) auxiliary grating 123 is placed on a light path where a light ray emitted from the incoherent light source 121 passes through the ABS pattern 200 and enters the light receiving unit 122. In FIG. 4, the ABS scale 110 and the ABS auxiliary grating 123 are placed between the incoherent light source 121 and the light receiving unit 122. The light emitted from the incoherent light source 121 passes through the ABS pattern 200 on the absolute scale 110 and the ABS auxiliary grating 123 and then enters the light receiving unit 122.

When the ABS scale 110 and the ABS auxiliary grating 123 are arranged with an distance u, an interference pattern 401 is generated on a plane at a distance v from the ABS auxiliary grating 123.

The interference pattern 401 that is generated when the spatial frequency of the ABS auxiliary grating 123 is $f_1$ and the frequency of the ABS grating 211 in the grating part 210 of the ABS scale 110 is $f_2$ is described below.

First, in the case where the ABS auxiliary grating 123 and the ABS grating 211 work in collaboration with each other as a diffraction grating, the relationship of the respective spatial frequencies is represented as:

$$f_2/f_1 = 2 \cdot v/(u+v)$$

and when the frequency of the interference pattern 401 is $F_3$, it is represented as:

$$F_3/f_1 = 2 \cdot u/(u+v)$$

where v=u when $f_1=f_2=F_3$.

Thus, when the spatial frequency of the ABS auxiliary grating 123 and the spatial frequency of the ABS grating 211 in the grating part 210 of the ABS scale 110 are the same, the interference pattern 401 of the same frequency as the two gratings is generated on the plane at the same distance from the ABS auxiliary grating 123 as the distance between the ABS auxiliary grating 123 and the ABS scale 110.

On the other hand, in the case where the ABS auxiliary grating 123 and the ABS grating 211 do not work in collaboration as a diffraction grating and work in collaboration to raise the shutter effect, the relationship of the respective spatial frequencies is represented as:

$$f_2/f_1 = v/(u+v)$$

$$F_3/f_1 = u/(u+v)$$

where v=u when $f_1=2f_2=2F_3$.

Thus, when the spatial frequency of the ABS auxiliary grating 123 is twice the spatial frequency of the ABS grating 211 in the grating part 210 of the ABS scale 110 (when the pitch is half), the interference pattern 401 of the same frequency as the ABS grating 211 is generated on the plane at the same distance from the ABS auxiliary grating 123 as the distance between the ABS auxiliary grating 123 and the ABS scale 110.

Although a review on the condition of u=v is provided above, the interference pattern 401 is generated also in the condition other than u=v as long as the ABS auxiliary grating 123 and the ABS grating 211 are set to the spatial frequency that is appropriately calculated in the above equation.

As described above, the condition for generating the interference pattern 401 is that u, v, $F_1$ and $f_2$, which are the parameters of the above equation, satisfy the above equation, and there is no restriction on the value of u or v. Therefore, as long as the above equation is satisfied, even when the distance u between the ABS scale 110 and the ABS auxiliary grating 123 increases, the position where the interference pattern 401 is generated is at the distance v from the ABS auxiliary grating 123. By placing the light receiving unit 122 in the position at the distance v from the ABS auxiliary grating 123, the interference pattern 401 can be reliably detected.

It is thereby possible to have a large gap between the detection head 120 and the ABS scale 110 without using a lens.

In the first embodiment, the incoherent light source 121 and the ABS auxiliary grating 123 constitute an absolute interference pattern generation means 130.

On the ABS scale 110, the grating part 210 of the ABS pattern 200 is provided in a discontinuous manner. Accordingly, the interference pattern 401 does not appear continuously, and the interference pattern 401 appears only in the part straightly below the grating part 210 (see the interference pattern 401 in FIG. 4).

Therefore, when the sensor 301 on the light receiving unit 122 is placed on the plane where the interference pattern 401 appears, the light receiving unit 122 converts the discontinuous interference pattern 401 into an electrical signal (interference pattern signal 402). After that, the interference pattern signal processing unit 124 detects pseudo-random data of the ABS pattern 200 from an envelope 404 of the interference pattern signal 402. The interference pattern signal 402 corresponding to the length $P_{DATA}$ on the ABS scale 110 is equivalent to one unit of pseudo-random data.

On the ABS pattern 200, the grating part 210 with the ABS grating 211 is provided in conformity with pseudo-random data. However, if light from the light source diverges, a light ray comes below the dark part 220 and generates the interference pattern 401. In this case, the interference pattern signal 402 generated by the grating part 210 interferes with the 0-signal region corresponding to the dark part 220. This may hinder accurate detection of the 0-signal region.

In order to avoid the overlap of the interference patterns 401 respectively generated by the two grating parts 210 placed with the dark part 220 interposed therebetween, it is necessary to place the ABS scale 110, the ABS auxiliary grating 123 and the light receiving unit 122 to satisfy certain conditions. Hereinafter, the conditions for avoiding the overlap of the interference patterns 401 respectively generated by the two grating parts 210 are described with reference to FIGS. 5 to 12.

Figure 5:
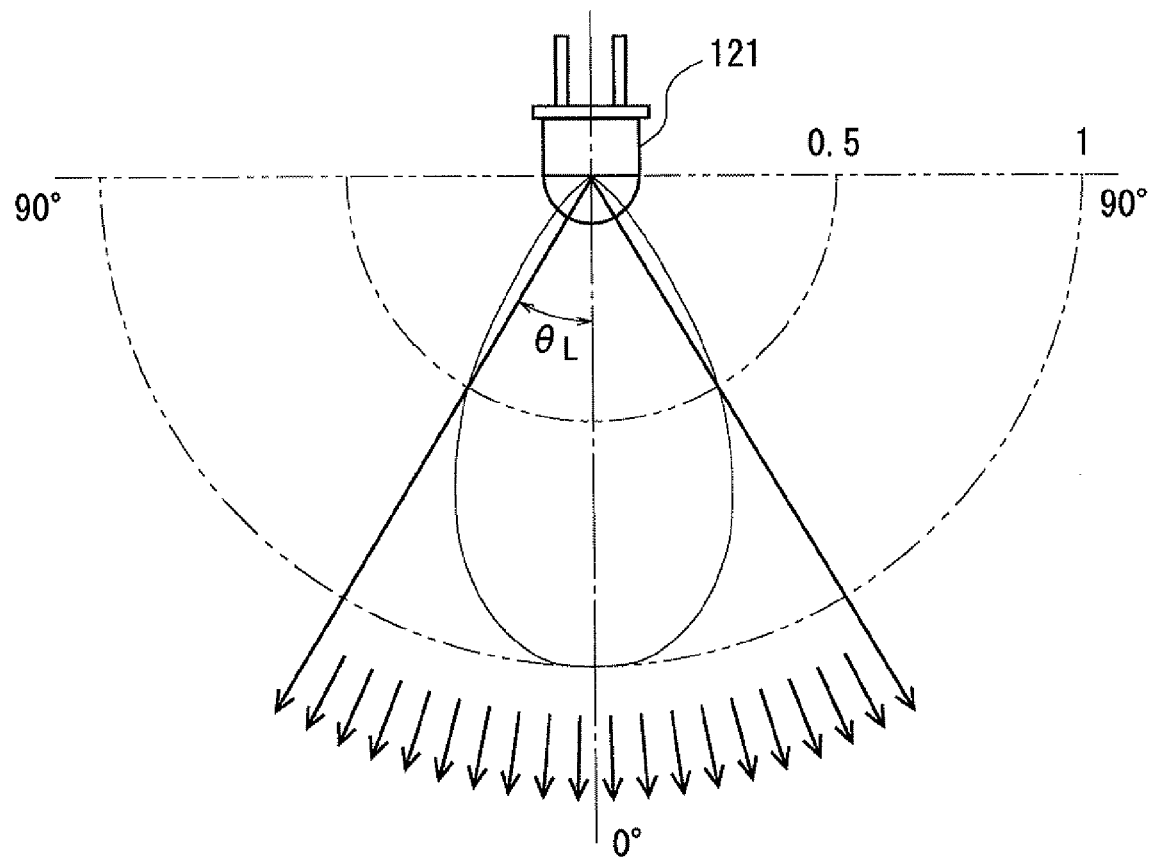
FIG. 5 is a view showing a range where light emission of a light source of the photoelectric encoder according to the first embodiment is 50% superimposed on a graph of light emission directional characteristics of the light source.

FIG. 5 is a view showing a range where light emission of the incoherent light source 121 is 50% superimposed on a graph of light emission directional characteristics of the incoherent light source 121.

The graph of light emission directional characteristics shows the percentage of the emission intensity viewed from the direction at θ degrees to the center axis when the emission intensity on the center axis of the incoherent light source 121 is 100%. The angle at which the emission intensity is 50% of the emission intensity on the center axis is called a half-power angle $\theta_L$.

Figure 6:
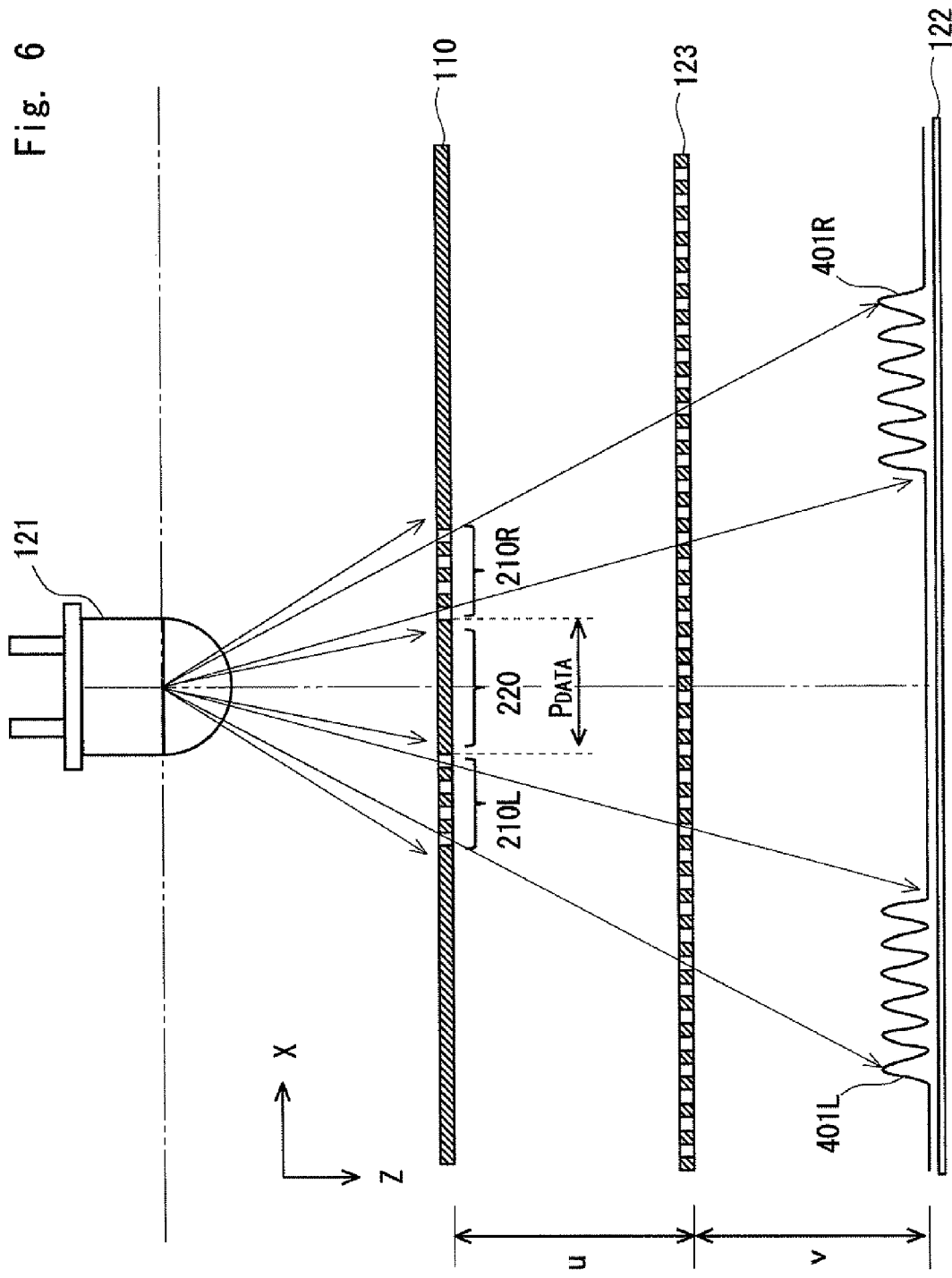
FIG. 6 is a view showing a state where the light source of the photoelectric encoder according to the first embodiment is placed straightly above the center of a dark part.

FIG. 6 shows a state where the incoherent light source 121 shown in FIG. 5 is placed straightly above the center of the dark part 220 corresponding to "0" of one pseudo-random data, and the grating parts 210R and 210L indicating "1" of pseudo-random data are placed on both sides of the dark part 220.

Consider the case where light is emitted only from the center part of the incoherent light source 121 at the half-power angle $\theta_L$. In this case, the light having passed through the left grating part 210L and the light having passed through the right grating part 210R do not cross each other, and interference patterns 401R and 401L are respectively generated on the light receiving unit 122.

In FIG. 6, it is assumed that the incoherent light source 121 is a point source. The point source that emits light only from a small point is an ideal light source. However, as the light source used for the photoelectric encoder, a light emitting part 510 is circular or rectangle with several μm for a point laser light source and 100 μm to several mm for LED.

Figure 7:
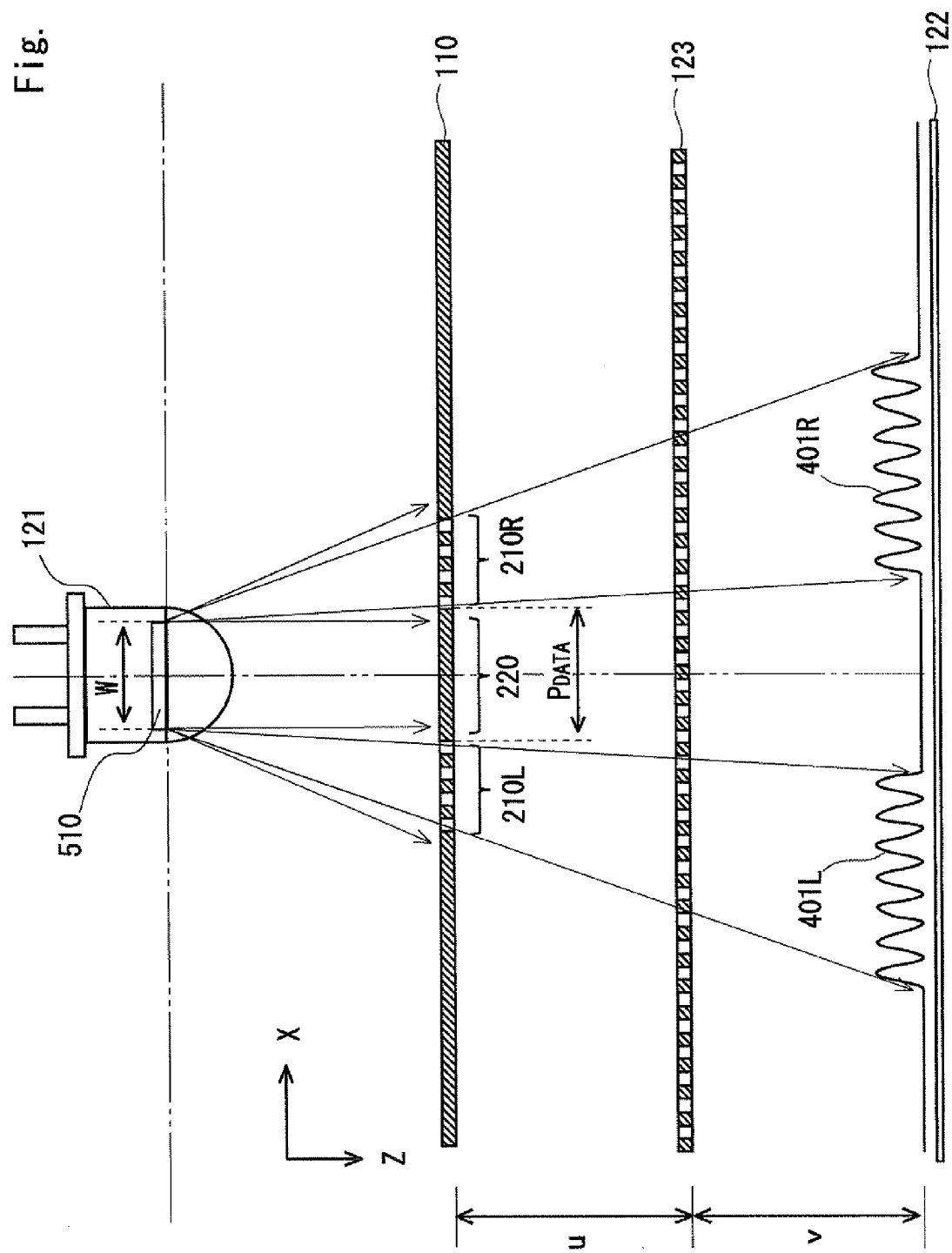
FIG. 7 is a view showing a position where an interference pattern is generated in the case where a size W in the measurement direction of a light emitting part of the light source is smaller than a data pitch $P_{DATA}$ in the photoelectric encoder according to the first embodiment.

FIG. 7 shows a position where the interference pattern 401 is generated in the case where a size W in the measurement direction of the light emitting part 510 of the light source is smaller than the data pitch $P_{DATA}$. The light emitted from any part of the light emitting part 510 and having passed through the grating parts 210R and 210L on the right and left of the dark part 220 in FIG. 7 reach the light receiving unit 122 without crossing each other. On the light receiving unit 122, the interference patterns 401R and 401L respectively corresponding to the right and left grating parts 210R and 210L are generated separately from each other. Accordingly, "1" of the pseudo-random data represented by the grating parts 210R and 210L can be detected in distinction from each other.

Figure 8:
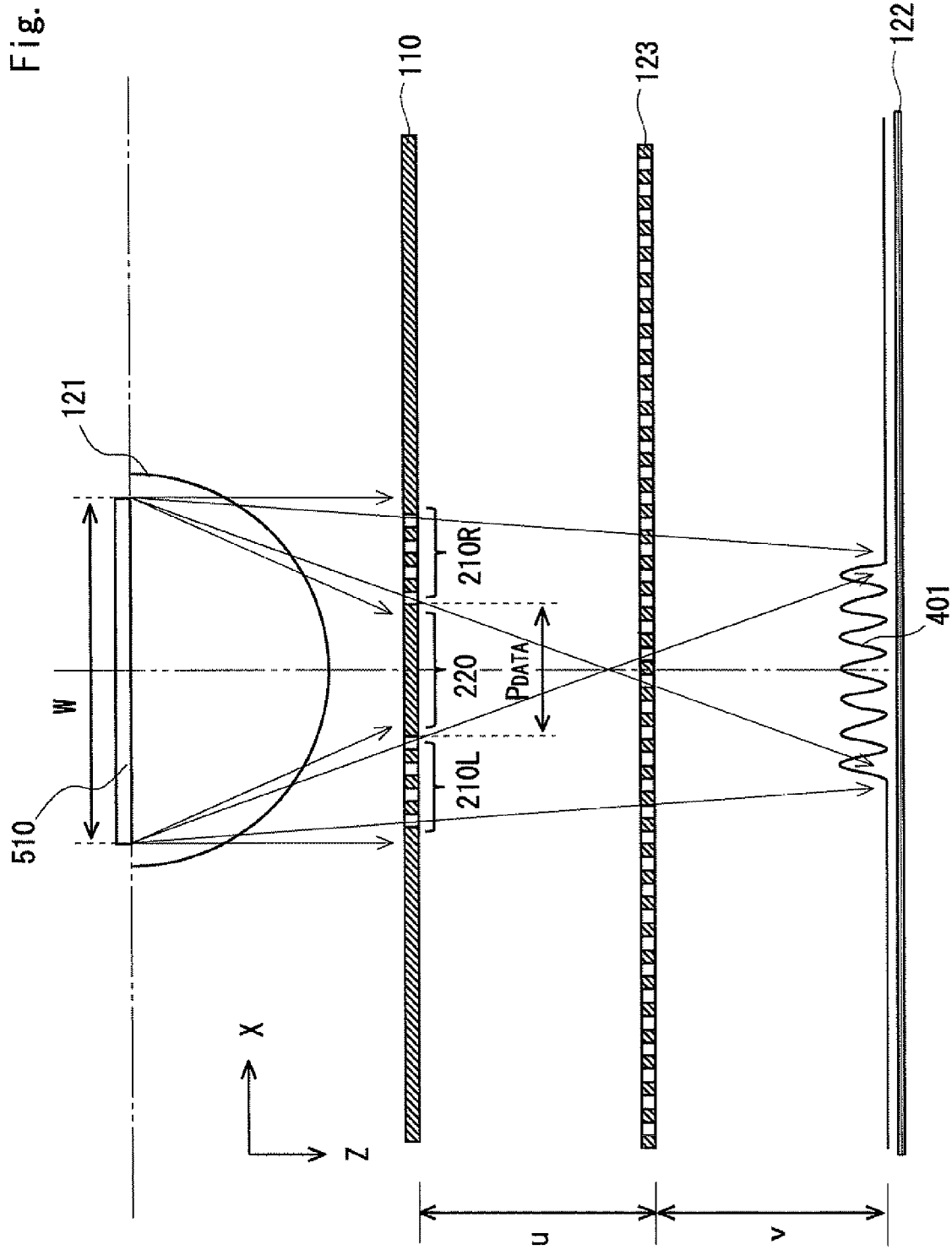
FIG. 8 is a view showing a position where an interference pattern is generated in the case where a size W in the measuring direction of a light emitting part of the light source is larger than a data pitch $P_{DATA}$ in the photoelectric encoder according to the first embodiment.

FIG. 8 shows a position where the interference pattern is generated in the case where the light emitting part 510 is larger than the data pitch $P_{DATA}$. Due to limitations of space, the incoherent light source 121 is shown only partly (this is the same for FIGS. 10 to 12). In this case, the light having passed through the right and left grating parts 210R and 210L can cross each other on the light receiving unit 122 straightly below the dark part 220. Then, the interference patterns 401R and 401L respectively generated by the grating parts 210R and 210L overlap in the same point and cannot be distinguished from each other. Accordingly, "1" of the pseudo-random data represented by the right and left grating parts 210R and 210L cannot be detected in distinction from each other.

Figure 9:
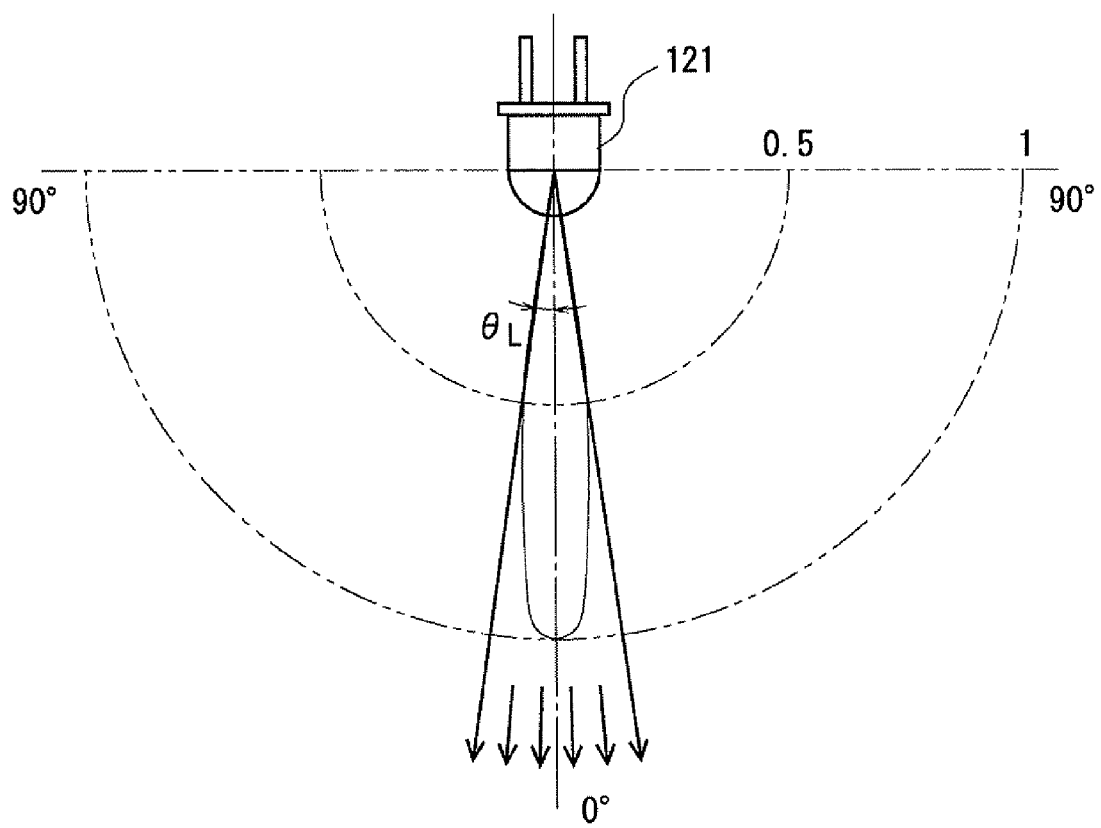
FIG. 9 is a view showing a case where light emission directional characteristics of the light source are set sharper in the photoelectric encoder according to the first embodiment.
Figure 10:
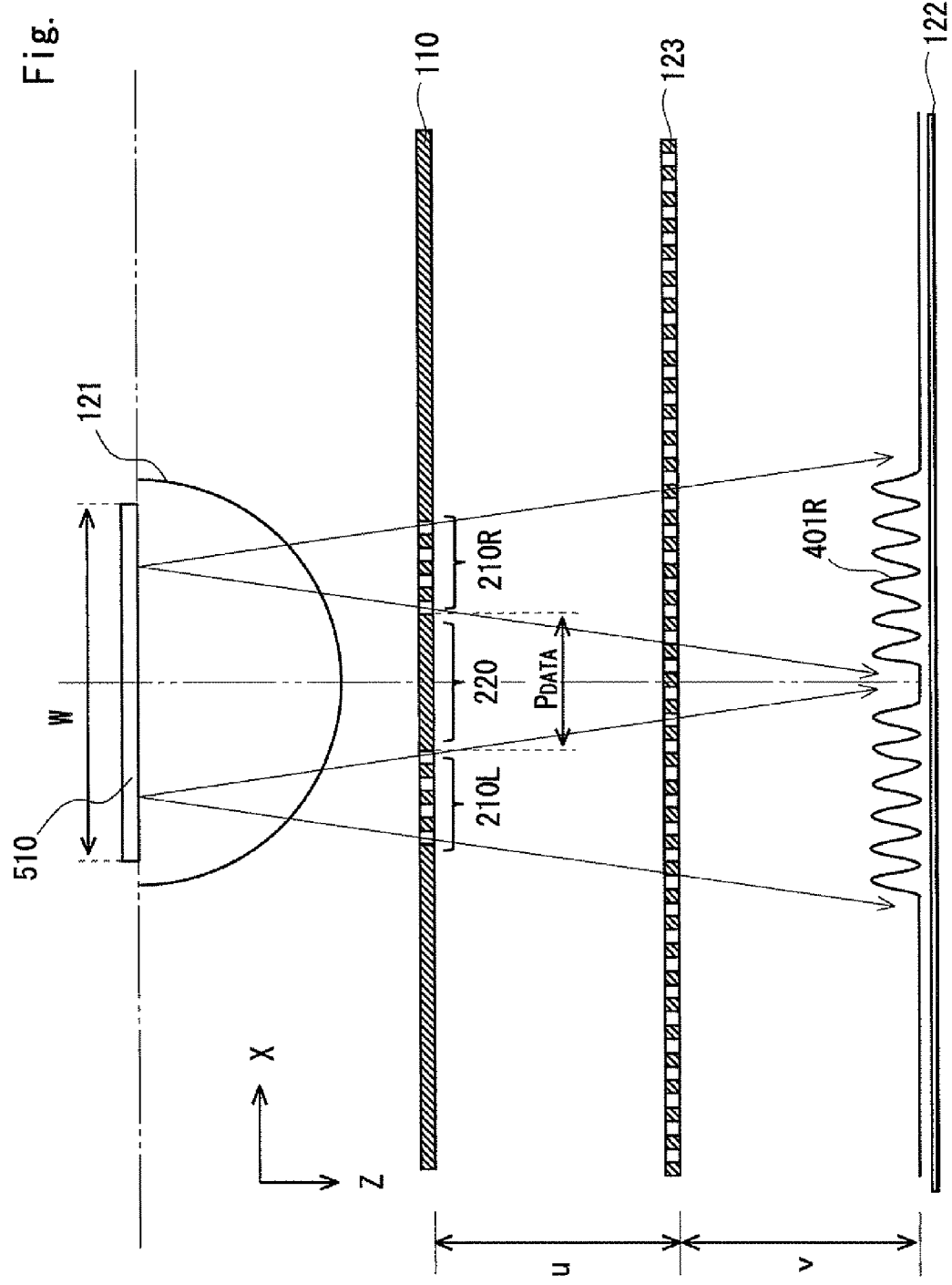
FIG. 10 is a view showing a state where interference patterns by two grating parts are generated separately in the case where light emission directional characteristics of the light source are set sharper in the photoelectric encoder according to the first embodiment.

To solve this problem, light emission directional characteristics of the light source are set sharper to reduce the half-power angle $\theta_L$ as shown in FIG. 9. When the half-power angle $\theta_L$ is sufficiently small, the light having passed through the right and left grating parts 210R and 210L do not cross each other as shown in FIG. 10, and therefore the interference patterns 401R and 401L respectively generated by the grating parts 210R and 210L can be detected in distinction from each other.

Figure 11:
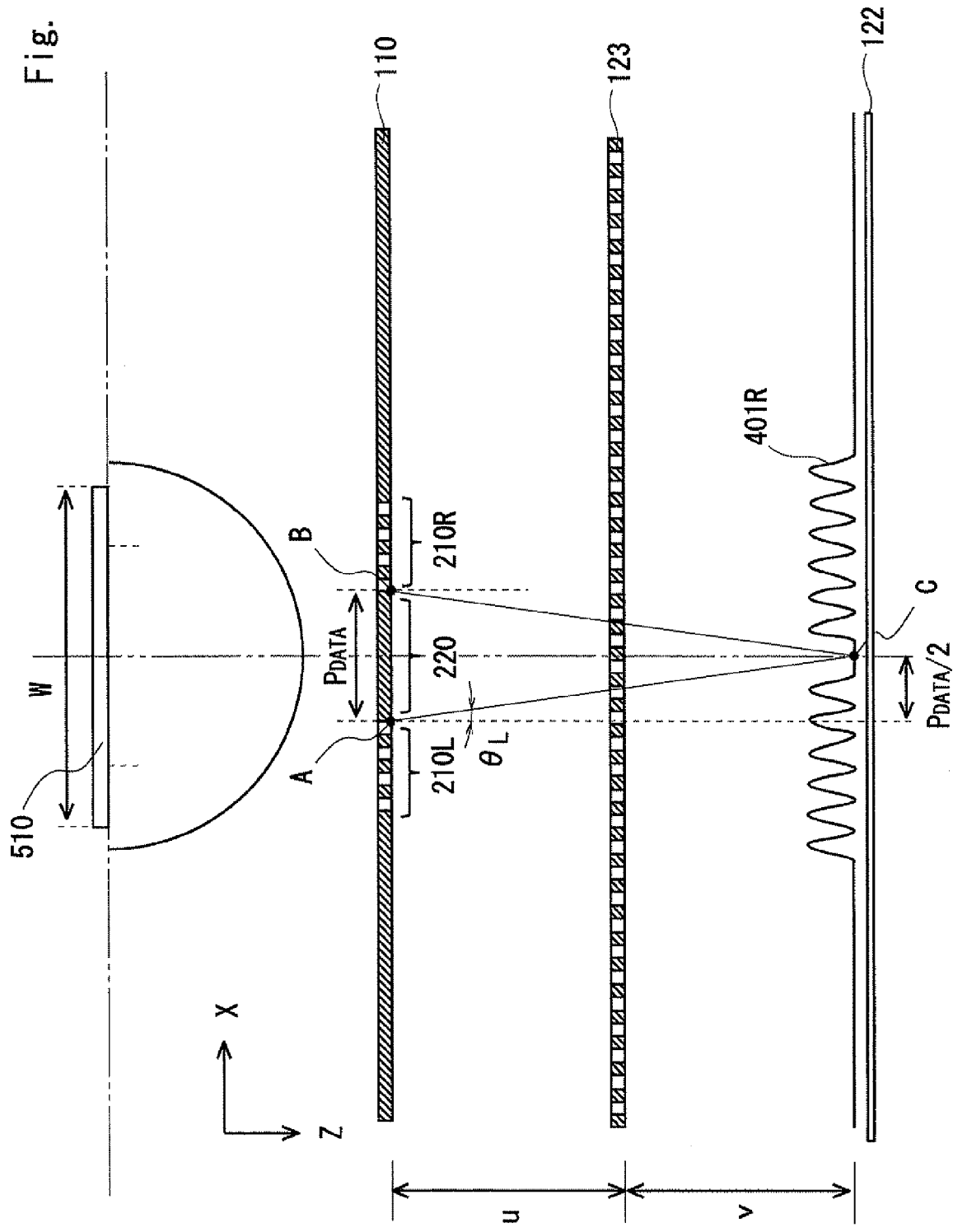
FIG. 11 is a view showing a condition where interference patterns generated by two grating parts placed with a dark part interposed therebetween do not overlap in the photoelectric encoder according to the first embodiment.

To avoid the overlap of light from the right and left grating parts 210R and 210L, light emission directional characteristics are set so that a light ray coming from the right end A of the grating part 210L and a light ray coming from the left end B of the grating part 210R meet at the point C on the light receiving unit 122 as shown in FIG. 11. In other words, the following conditional expression (1) needs to be satisfied.

Expression 1:

$$\theta_L \le \tan^{-1}\left(\frac{P_{DATA}}{2(u+v)}\right) \tag{1}$$

By satisfying the conditional expression (1), it is possible to prevent a crosstalk of light rays and overcome the disadvantage that the grating parts 210 placed with the dark part 220 interposed therebetween are not recognized in distinction from each other. Note that, the half-power angle $\theta_L$ is preferably smaller to increase the accuracy of detecting the ABS pattern 200.

Figure 12:
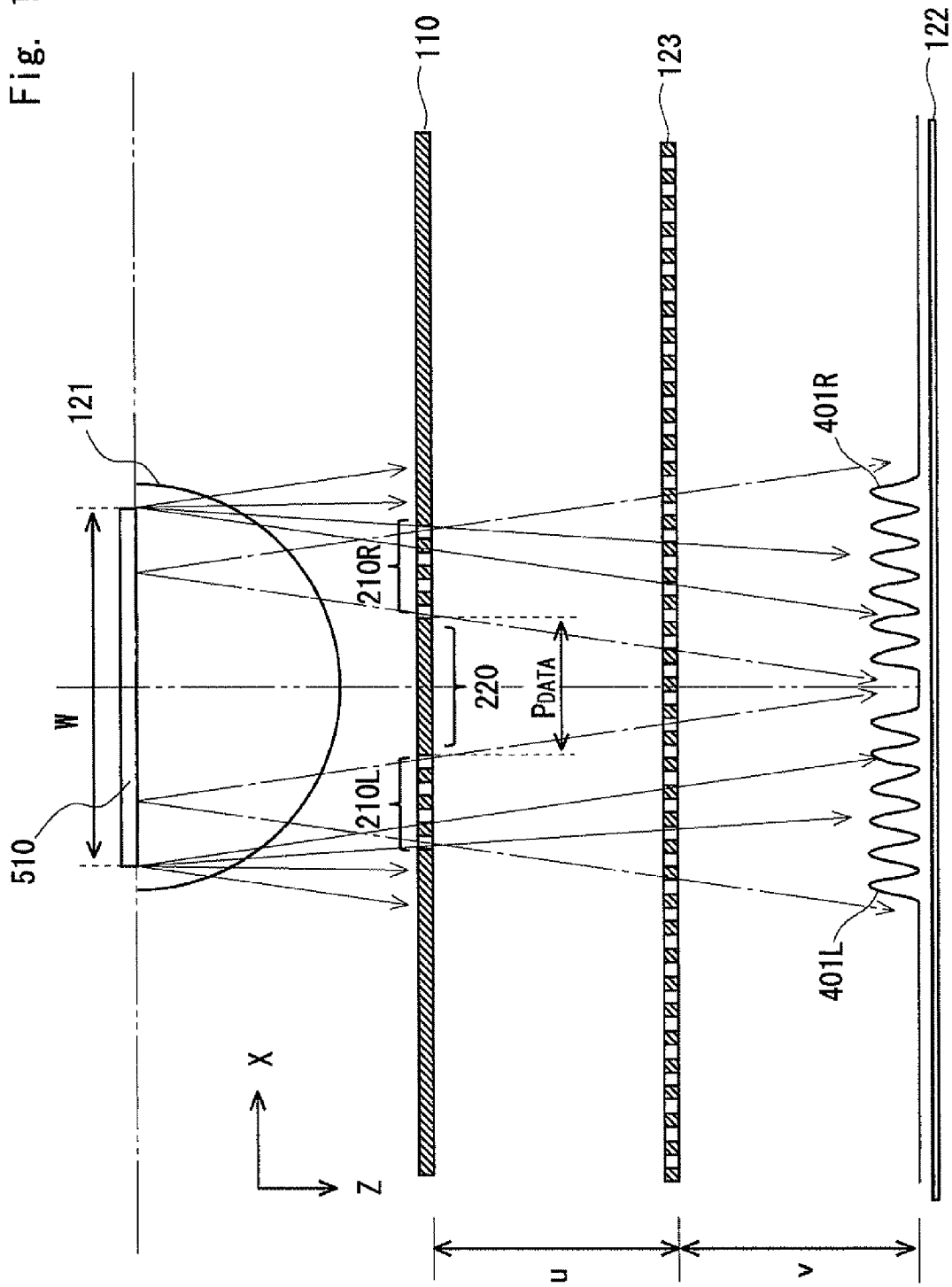
FIG. 12 is a view showing that light rays having passed through the grating parts on the left and right of a dark part do not cross each other when the conditional expression (1) is satisfied in the photoelectric encoder according to the first embodiment.

Further, as shown in FIG. 12, as long as the half-power angle $\theta_L$ satisfies the conditional expression (1), a light ray having passed through the left grating part 210L does not cross a light ray having passed through the right grating part 210R on the light receiving unit 122 regardless of the size of the light emitting part 510 of the light source. Likewise, a light ray having passed through the right grating part 210R does not cross a light ray having passed through the left grating part 210L on the light receiving unit 122. There is thus no need to impose restrictions on the size of the light emitting part 510 of the light source for preventing a crosstalk of light rays, which allows more flexible selection of a light source.

A method of manufacturing the ABS scale 110 is described hereinafter. After a thin metal film such as chromium is formed on the surface of a plate glass base material, a photosensitive resin film is formed on the surface of the thin metal film. Next, the photosensitive resin film is exposed and deposited to transfer the ABS pattern 200 and the ABS grating 211 on the photosensitive resin film. For the exposure of the photosensitive resin film, a mask provided with the ABS pattern 200 and the ABS grating 211 is used, for example. Finally, the thin metal film is etched to form the ABS pattern 200 and the ABS grating 211 on the ABS scale 110.

As described above, with the photoelectric encoder 100 according to this embodiment, it is possible to provide a photoelectric encoder that can have a large gap between a scale and a detection head without using a lens and can detect pseudo-random data on the scale.

Because the photoelectric encoder 100 according to this embodiment has a structure not using a lens, the size can be reduced by the volume of a lens-barrel.

Further, because the photoelectric encoder 100 according to this embodiment has a structure not using a lens and a lens array, the number of parts is reduced, achieving lower costs.

Further, the photoelectric encoder 100 according to this embodiment can detect pseudo-random data even if a gap between the detection head and the scale is enlarged. It is thus tolerable for entering of a foreign matter into the gap between the detection head and the scale.

Second Embodiment

Figure 13:
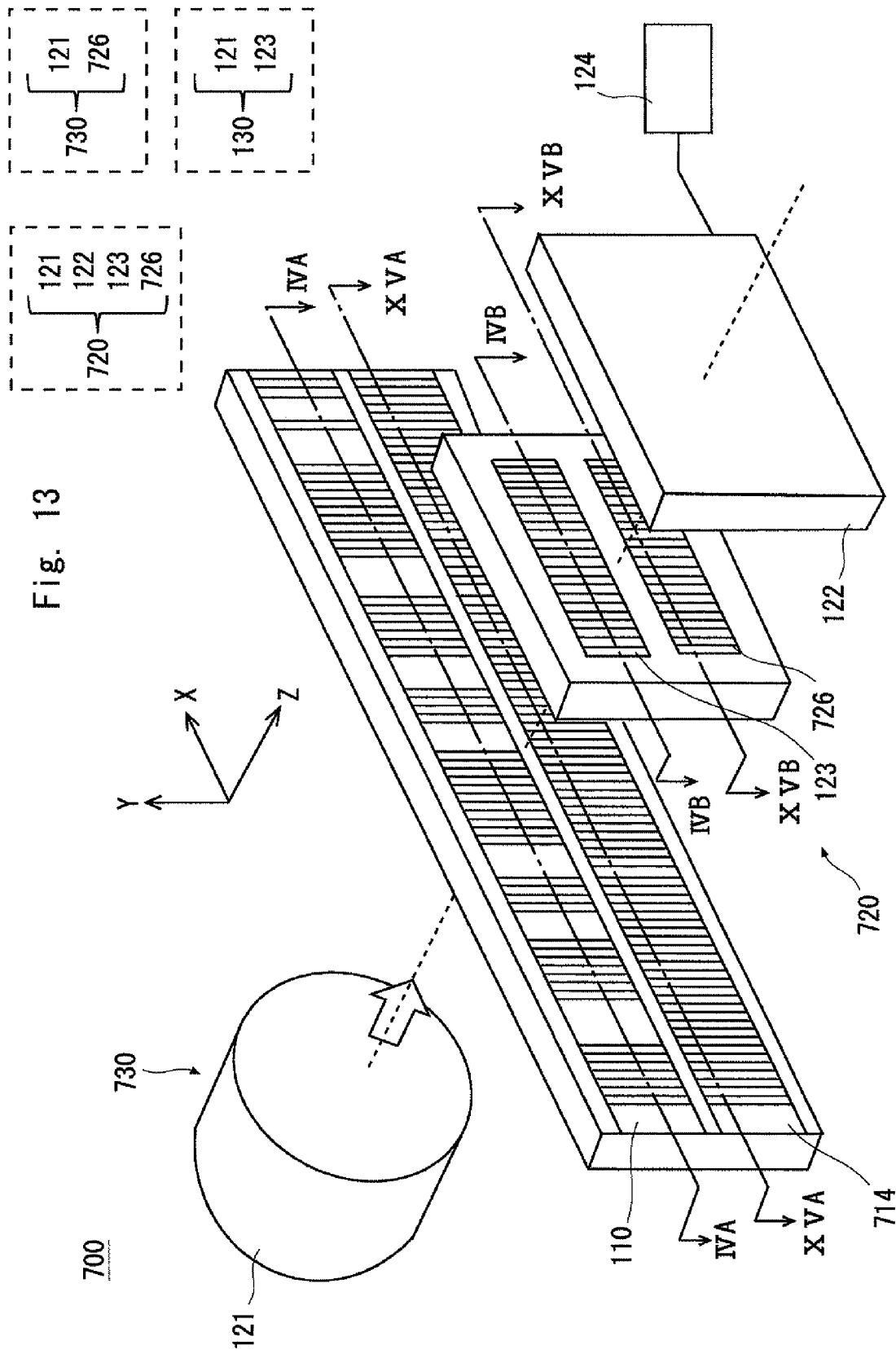
FIG. 13 is a view showing a structure of a photoelectric encoder according to a second embodiment.

FIG. 13 is a view showing a structure of a photoelectric encoder 700 according to a second embodiment of the present invention. The photoelectric encoder 700 includes an absolute (ABS) scale 110, an incremental (INC) scale 714, and a detection head 720. The photoelectric encoder 700 detects the absolute position of the detection head 720 with respect to the ABS scale 110 and further detects the relative moving amount of the detection head 720 with respect to the INC scale 714.

The detection head 720 includes an incoherent light source 121, a light receiving unit 122, and an interference pattern signal processing unit 124. Further, the photoelectric encoder 700 according to this embodiment includes an absolute (ABS) auxiliary grating 123 and an incremental (INC) auxiliary grating 726 between the absolute scale 110 and the INC scale 714, and the light receiving unit 122.

Figure 14:
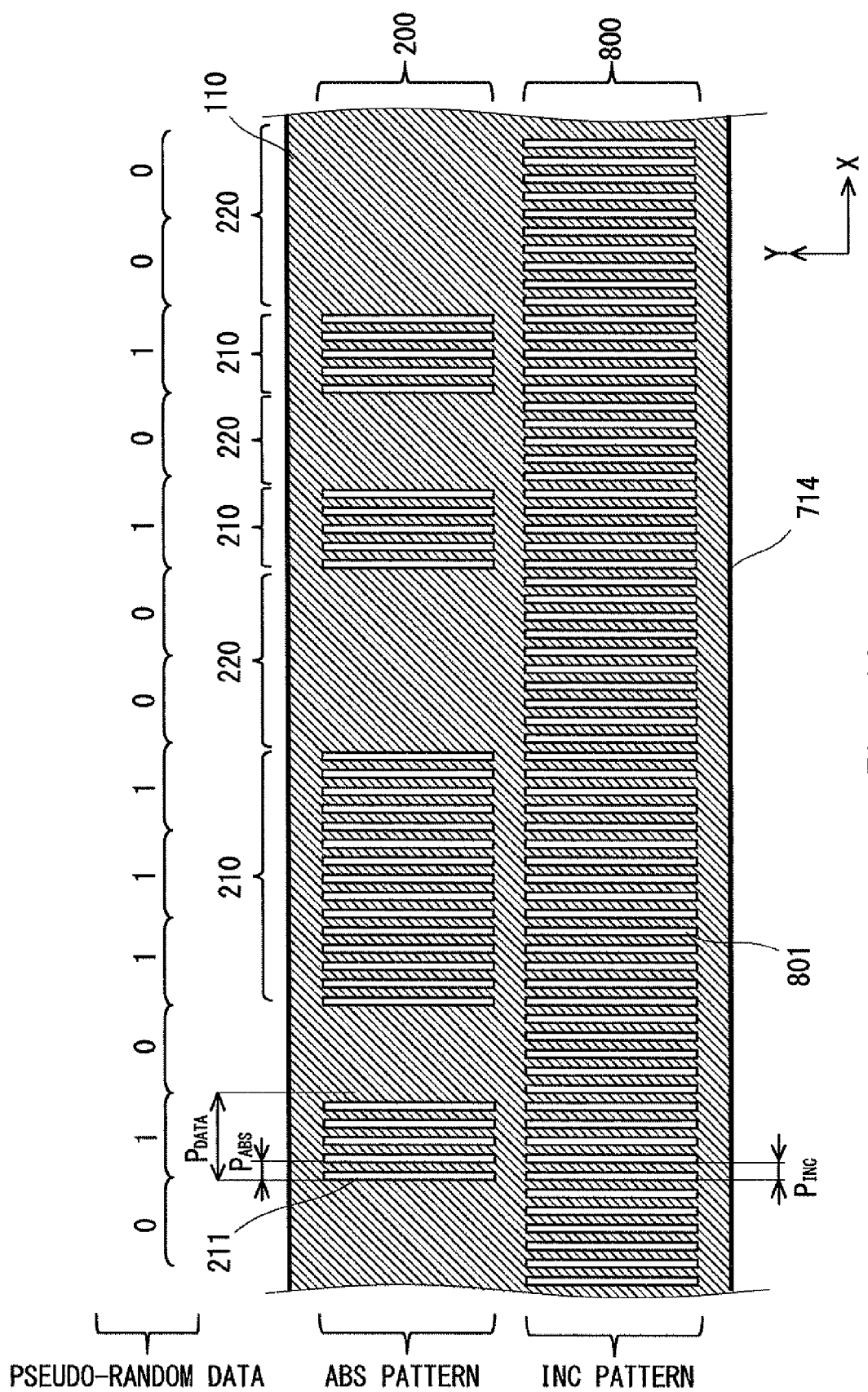
FIG. 14 is a view showing a structure of a scale according to the second embodiment.

FIG. 14 is a view showing a structure of a scale according to the second embodiment. As shown in FIG. 14, in the photoelectric encoder 700 according to the second embodiment of the invention, the incremental (INC) scale 714 and the absolute (ABS) scale 110 are arranged in parallel in an integral form. The INC scale 714 and the ABS scale 110 may be separated.

As shown in FIG. 14, the ABS scale 110 is provided with an absolute (ABS) pattern 200. The ABS scale 110 has the same structure as that of the first embodiment. In the ABS pattern 200, a grating part 210 and a dark part 220 on the basis of pseudo-random data are provided. The grating part 210 is a region corresponding to the pseudo-random data "1", and the dark part 220 is a region corresponding to the pseudo-random data "0".

The INC scale 714 is provided with an incremental (INC) pattern 800. In the INC pattern 800, an incremental (INC) grating 801 with a pitch $P_{INC}$ is arranged continuously in the measurement axis direction.

In the photoelectric encoder 700 according to this embodiment, the INC scale 714 and the ABS scale 110 are integrally formed in parallel with each other. In this structure, it is possible to detect the absolute position and the relative moving amount of the detection head 720 with respect to the scale at the same time.

In the case of detecting the absolute position and the relative moving amount of the detection head 720 with respect to the scale at the same time, two linear image sensors or a two-dimensional image sensor is used as the light receiving unit 122. It is thereby possible to detect the two interference patterns generated from the INC scale 714 and the ABS scale 110 at the same time.

Further, in the photoelectric encoder 700 according to this embodiment, rough position detection using the ABS scale 110 and precise position detection using the INC scale 714 can be combined. This enables prompt and highly accurate position detection.

In the photoelectric encoder 700 according to this embodiment, the grating pitch $P_{ABS}$ of the grating part 210 of the ABS pattern 200 and the grating pitch $P_{INC}$ of the INC pattern 800 may be the same.

By setting the same grating pitch, it is possible to create the two patterns, absolute and incremental, using one type of mask. In this case, only one type of mask needs to be fabricated for creating the patterns. Because the mask is expensive, the manufacturing costs of the scale can be thereby reduced.

Figure 15:
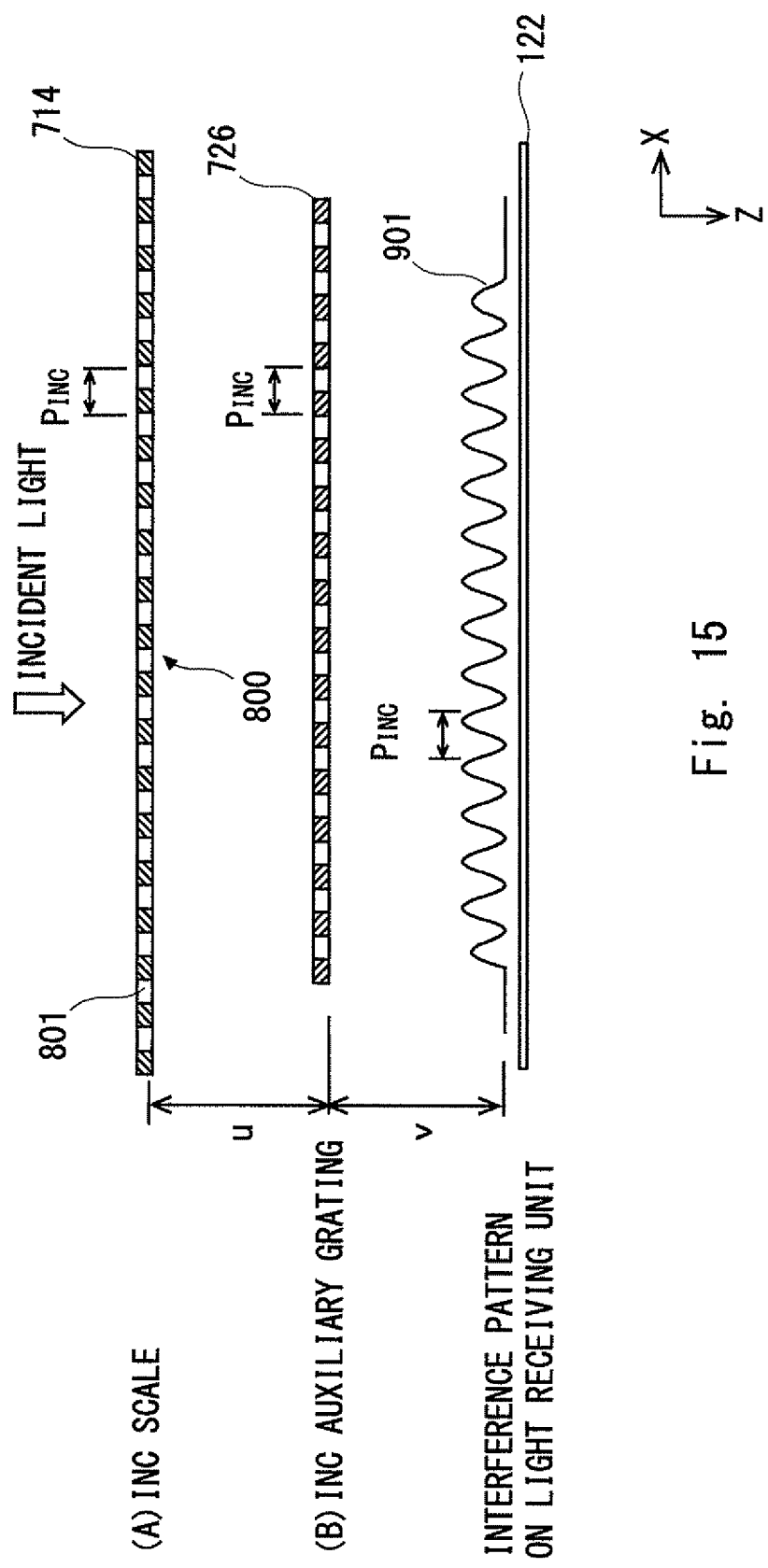
FIG. 15 is a cross-sectional view on an incremental scale side of the photoelectric encoder according to the second embodiment.

FIG. 15 is a cross-sectional view on the incremental scale side of the photoelectric encoder 700 according to the second embodiment of the invention. It shows a cross section on the INC scale 714 side in FIG. 13. A relative position detection method of the photoelectric encoder 700 according to this embodiment is described hereinafter with reference to FIG. 15. As shown in FIG. 15, the INC auxiliary grating 726 is placed on a light path where a light ray emitted from the incoherent light source 121 passes through the INC scale 714 and enters the light receiving unit 122.

Specifically, in FIG. 15, the INC scale 714 and the INC auxiliary grating 726 are placed between the incoherent light source 121 and the light receiving unit 122. The light emitted from the incoherent light source 121 passes through the INC pattern 800 on the INC scale 714 and the INC auxiliary grating 726 and then enters the light receiving unit 122.

Just like the case of the ABS scale 110, when the INC scale 714 and the INC auxiliary grating 726 are arranged with an distance u, an interference pattern 901 is generated on a plane at a distance v from the INC auxiliary grating 726.

The interference pattern 901 that is generated when the spatial frequency of the INC auxiliary grating 726 is $f_1$ and the frequency of the INC grating 801 of the INC pattern 800 on the INC scale 714 is $f_2$ is described below.

First, in the case where the INC auxiliary grating 726 and the INC grating 801 work in collaboration with each other as a diffraction grating, the relationship of the respective spatial frequencies is represented as:

$$f_2/f_1 = 2 \cdot v/(u+v)$$

and when the frequency of the interference pattern 901 is $F_3$, it is represented as:

$$F_3/f_1 = 2 \cdot u/(u+v)$$

where v=u when $f_1=f_2=F_3$.

Thus, when the spatial frequency of the INC auxiliary grating 726 and the spatial frequency of the INC grating 801 are the same, that is, when the pitches of the both gratings are the same, the interference pattern 901 of the same frequency as the two gratings is generated on the plane at the same distance from the INC auxiliary grating 726 as the distance between the INC scale 714 and the INC auxiliary grating 726.

On the other hand, in the case where the INC auxiliary grating 726 and the INC grating 801 do not work in collaboration as a diffraction grating and work in collaboration to raise the shutter effect, the relationship of the respective spatial frequencies is represented as:

$$f_2/f_1 = v/(u+v)$$

$$F_3/f_1 = u/(u+v)$$

where v=u when $f_1=2f_2=2F_3$.

Thus, when the spatial frequency of the INC auxiliary grating 726 is twice the spatial frequency of the INC grating 801, that is, when the pitch of the INC auxiliary grating 726 is half the pitch of the INC grating 801, the interference pattern 901 of the same frequency as the INC grating 801 is generated on the plane at the same distance from the INC auxiliary grating 726 as the distance between the INC scale 714 and the INC auxiliary grating 726.

Although a review on the condition of u=v is provided above, the interference pattern 901 is generated also in the condition other than u=v as long as the INC auxiliary grating 726 and the INC grating 801 are set to the spatial frequency that is appropriately calculated in the above equation.

As described above, the condition for generating the interference pattern 901 is that u, v, $F_1$ and $f_2$, which are the parameters of the above equation, satisfy the above equation, and there is no restriction on the value of u or v. Therefore, as long as the above equation is satisfied, even when the distance u between the INC scale 714 and the INC auxiliary grating 726 increases, the position where the interference pattern 901 is generated can be at the distance v from the INC auxiliary grating 726. Even when the light receiving unit 122 is placed in the position at the distance v from the INC auxiliary grating 726, a part of the interference pattern 901 with high light intensity can be reliably detected.

It is thereby possible to have a large gap between the detection head 120 and the INC scale 714 without using a lens.

In the second embodiment, the incoherent light source 121 and the INC auxiliary grating 726 constitute an incremental interference pattern generation means 730.

Then, the generated interference pattern 901 is received by the light receiving unit 122 and converted into an electrical signal (interference pattern signal). The interference pattern signal generated from the interference pattern 901 is a signal having a waveform of the pitch $P_{INC}$ corresponding to the INC pattern 800. The interference pattern signal processing unit 124 measures the number of passing peaks of the interference pattern 901 during movement from a starting point. The photoelectric encoder 700 according to this embodiment detects the moving amount of the detection head 720 with respect to the INC scale 714 from the pitch $P_{INC}$ and the number of passing peaks of the interference pattern 901.

An absolute position detection method of the photoelectric encoder 700 according to this embodiment is the same as the absolute position detection method according to the first embodiment of the invention (see FIG. 4).

First, the incoherent light source 121 emits light to the ABS scale 110. The light having passed through the grating part 210 of the ABS pattern 200 on the ABS scale 110 passes through the ABS auxiliary grating 123 to cause the interference pattern 401 to be generated on the plane where the interference pattern 401 is placed.

The generated interference pattern 401 is received by the light receiving unit 122 and converted into an electrical signal (interference pattern signal 402). Then, pseudo-random data of the ABS pattern 200 is detected from an envelope 404 of the interference pattern signal 402 generated from the interference pattern 401.

Further, in the photoelectric encoder 700, a periodical signal obtained from the interference pattern 901 generated by the INC pattern 800 is also detected.

Thus, a synchronization signal waveform for detecting the envelope 404 from the absolute interference pattern signal 402 by synchronous detection can be created based on the periodical signal obtained from the incremental interference pattern 901. By detecting the signal of the interference pattern 401 generated by the ABS pattern 200 using the synchronization signal waveform, a tolerance for disturbance such as noise increases.

In the photoelectric encoder 700, the grating pitch of the ABS pattern 200 and the grating pitch of the INC pattern 800 may be different. For example, the grating pitch of the ABS pattern 200 may be 7 µm, and the grating pitch of the INC pattern 800 may be 4 µm.

Even when the interference pattern by the INC pattern 800 is incident on the light receiving unit 122 on the ABS pattern 200 side, because the pitch of the interference pattern signal is different between absolute and incremental, the both signals can be separated from the interfering state.

Third Embodiment

Figure 16:
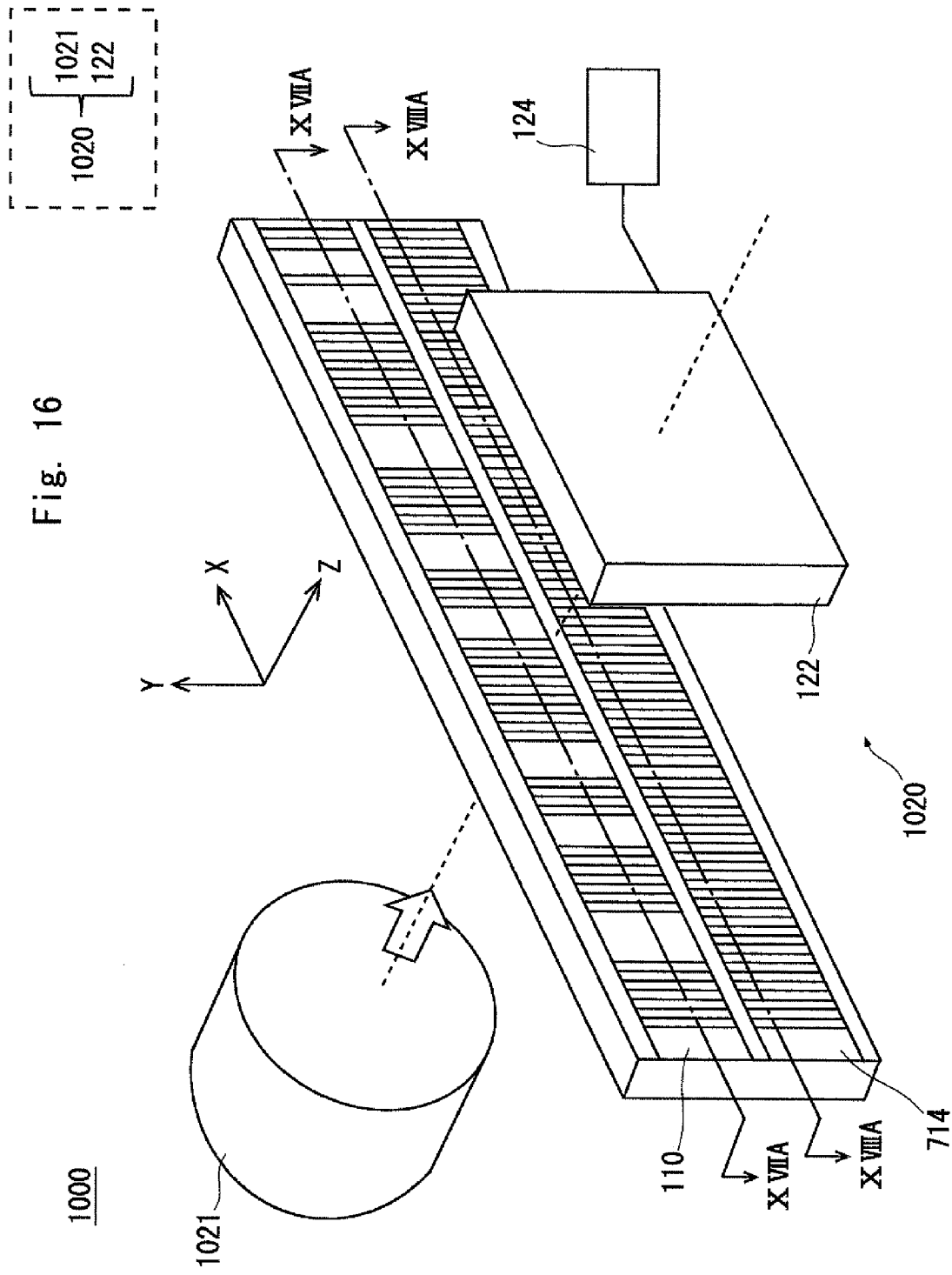
FIG. 16 is a view showing a structure of a photoelectric encoder according to a third embodiment.

FIG. 16 is a view showing a structure of a photoelectric encoder according to a third embodiment of the present invention. As shown in FIG. 16, the photoelectric encoder 1000 according to the third embodiment of the invention includes an absolute (ABS) scale 110, an incremental (INC) scale 714, and a detection head 1020. The detection head 1020 includes a coherent light source 1021, a light receiving unit 122, and an interference pattern signal processing unit 124.

The photoelectric encoder 1000 according to this embodiment detects the absolute position of the detection head 1020 with respect to the ABS scale 110 and further detects the relative moving amount of the detection head 1020 with respect to the INC scale 714.

The coherent light source 1021 emits coherent light. As the coherent light source 1021, a semiconductor laser is used, for example.

Figure 17:
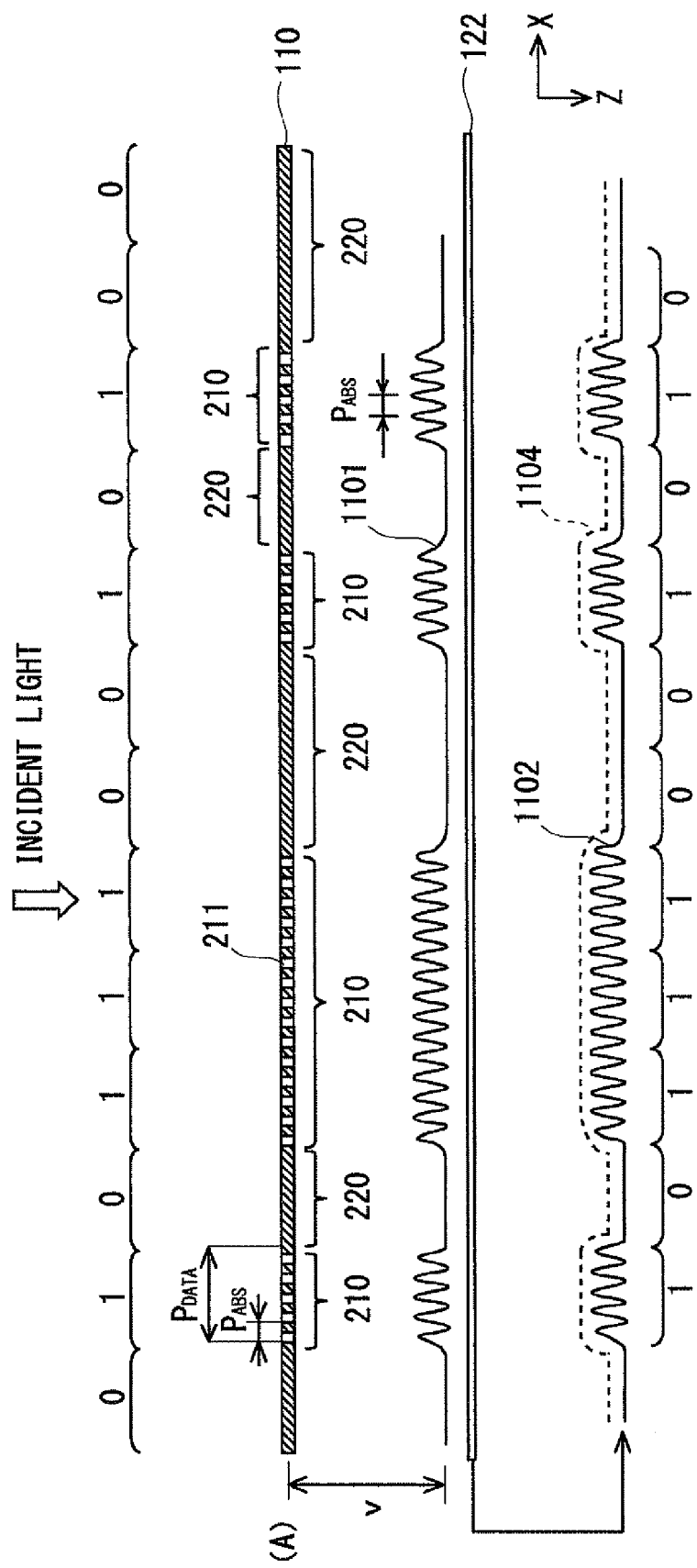
FIG. 17 is a cross-sectional view on an absolute scale side of the photoelectric encoder according to the third embodiment.

FIG. 17 is a cross-sectional view on the ABS scale side of the photoelectric encoder 1000 according to this embodiment. An absolute position detection method of the photoelectric encoder 1000 according to this embodiment is described hereinafter with reference to FIG. 17.

First, the coherent light source 1021 emits light to the absolute scale 110. Because the light incident on the absolute scale 110 is coherent light, a self-interference pattern 1101 by the Talbot effect appears on a plane at a distance v from the ABS scale 110. When the wavelength of the coherent light is λ and the grating pitch of the grating part 210 of the ABS pattern 200 on the ABS scale 110 is $P_{ABS}$, the pitch of the self-interference pattern 1101 that is generated on the plane that satisfies $v=P_{ABS}^2 \div \lambda$ is $P_{ABS}$.

Then, the generated self-interference pattern 1101 is received by the light receiving unit 122 and converted into an electrical signal (interference pattern signal 1102). After that, pseudo-random data of the ABS pattern 200 is detected from an envelope 1104 of the interference pattern signal 1102 generated from the self-interference pattern 1101. The photoelectric encoder 1000 according to this embodiment thereby detects the absolute position of the detection head 1020 with respect to the ABS scale 110.

Figure 18:
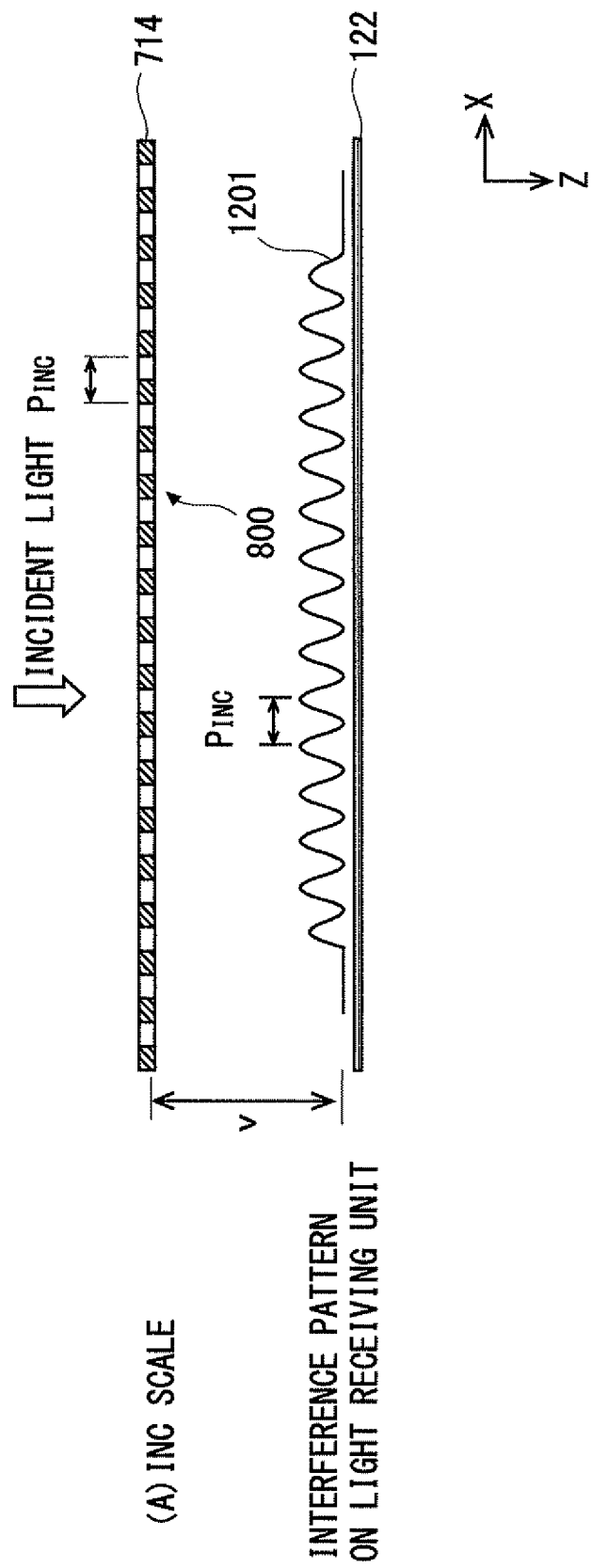
FIG. 18 is a cross-sectional view on an incremental scale side of the photoelectric encoder according to the third embodiment.

FIG. 18 is a cross-sectional view on the incremental scale side of the photoelectric encoder 1000 according to this embodiment. A relative position detection method of the photoelectric encoder 1000 according to this embodiment is described hereinafter with reference to FIG. 18.

First, the coherent light source 1021 emits light to the INC scale 714. Because the light incident on the INC scale 714 is coherent light, a self-interference pattern 1201 by the Talbot effect appears on a plane at a distance v from the INC scale 714. When the wavelength of the coherent light is λ and the grating pitch of the INC pattern 800 on the INC scale 714 is $P_{INC}$, the pitch of the self-interference pattern 1201 that is generated on the plane that satisfies $v=P_{INC}^2 \div \lambda$ is $P_{INC}$.

Then, the generated self-interference pattern 1201 is received by the light receiving unit 122 and converted into an electrical signal (self-interference pattern signal). The interference pattern signal generated from the self-interference pattern 1201 is a signal having a waveform of the pitch $P_{INC}$ corresponding to the INC pattern 800. The interference pattern signal processing unit 124 measures the number of passing peaks of the self-interference pattern 1201 during movement from a starting point. The photoelectric encoder 1000 according to this embodiment detects the moving amount of the detection head 1020 with respect to the INC scale 714 from the interference pattern signal generated from the pitch $P_{INC}$ of the self-interference pattern 1201 and the number of passing peaks.

Thus, in the third embodiment, the coherent light source 1021 serves as an interference pattern generation means. A self-interference pattern is generated on a specified plane when the coherent light passes through the ABS scale 110 or the INC pattern 800 without using the ABS auxiliary grating 123 or the INC auxiliary grating 726 as described in the first or second embodiment.

The photoelectric encoder 1000 according to this embodiment does not have the auxiliary grating as in the first or second embodiment. The number of parts is thereby reduced and the structure can be simplified. Further, because a step of adjusting the positions of the scale and the auxiliary grating is not needed, the manufacturing costs can be lowered.

The present invention is not restricted to the above-described embodiments, and various changes and modifications may be made without departing from the scope of the invention. For example, it is not limited to a transmissive linear encoder, and it may be a reflective linear encoder.

Further, although the present invention is described using a linear encoder as an example in the above-described embodiments, the present invention may be applied to a rotary encoder as well.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A photoelectric encoder comprising:
    an absolute scale provided with an absolute pattern based on pseudo-random data;
    a detection head including a light source that emits light to the absolute pattern of the absolute scale, and a light receiving unit that receives light from the absolute pattern, wherein the photoelectric encoder detects an absolute position of the detection head with respect to the absolute scale, and the absolute pattern is composed of a grating part and a dark part arranged in a repetitive manner;
    an interference pattern generation means that generates an interference pattern in combination with the grating part; and
    an interference pattern signal processing unit that detects the pseudo-random data of the absolute pattern based on the interference pattern received by the light receiving unit.

2. The photoelectric encoder according to claim 1, wherein the interference pattern generation means includes:
    the light source that emits incoherent light in the detection head; and
    an auxiliary grating that is placed on a light path where a light ray emitted from the light source passes through the absolute pattern and enters the light receiving unit.

3. The photoelectric encoder according to claim 1, wherein the light source emits coherent light.

4. The photoelectric encoder according to claim 2, wherein a half-power angle $\theta_L$ where an emission intensity of the light source is 50% of an emission intensity on a center axis of the light source, a data pitch $P_{DATA}$ of the absolute pattern, an distance u between the absolute scale and the auxiliary grating, and an distance v between the auxiliary grating and the light receiving unit satisfy a conditional expression (1):

$$\theta_L \leq \tan^{-1}\left(\frac{P_{DATA}}{2(u+v)}\right). \tag{1}$$

5. The photoelectric encoder according to claim 1, wherein an incremental scale provided with an incremental pattern is placed in parallel with the absolute scale.

6. The photoelectric encoder according to claim 5, wherein a grating pitch of the grating part of the absolute pattern and a grating pitch of the incremental pattern are equal.

7. The photoelectric encoder according to claim 6, wherein pseudo-random data of the absolute pattern is detected based on a periodical signal obtained from an interference pattern generated by the incremental pattern.

8. The photoelectric encoder according to claim 5, wherein a grating pitch of the absolute pattern and a grating pitch of the incremental pattern are different.

9. An absolute position detection method using a photoelectric encoder including an absolute scale provided with an absolute pattern based on pseudo-random data, a detection head including a light source, an interference pattern generation means and a light receiving unit, and an interference pattern signal processing unit, for detecting an absolute position of the detection head with respect to the absolute scale, the method comprising:
    a step of emitting light to the absolute pattern by the light source;
    a step of generating an interference pattern in the light from the absolute pattern by the interference pattern generation means;
    a step of receiving the interference pattern by the light receiving unit; and
    a step of detecting the pseudo-random data of the absolute pattern based on the interference pattern by the interference pattern signal processing unit.

* * * * *